Figure 1:
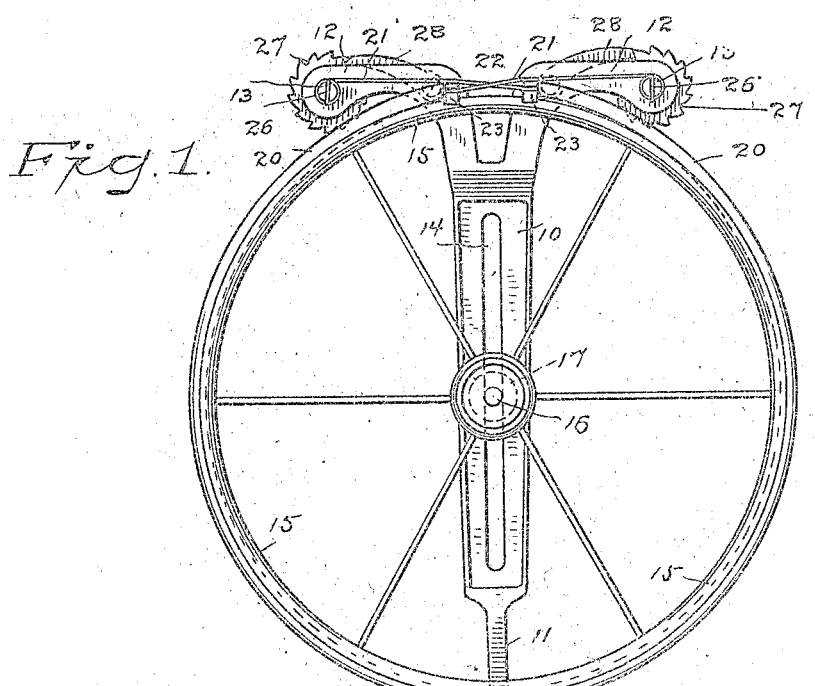

No. 874,984.

PATENTED DEC. 31, 1907.

S. A. OLIVA.
IMPLEMENT FOR APPLYING RUBBER TIRES.
APPLICATION FILED MAR. 13, 1907.

WITNESSES
H. A. Lamb
S. W. Atherton

INVENTOR
Sabbath A. Oliva
BY
A. M. Wooster
ATTORNEY

UNITED STATES PATENT OFFICE.

SABBATH A. OLIVA, OF DANBURY, CONNECTICUT.

IMPLEMENT FOR APPLYING RUBBER TIRES.

No. 874,964.

Specification of Letters Patent.

Patented Dec. 31, 1907.

Application filed March 13, 1907. Serial No. 362,208.

*To all whom it may concern:*

Be it known that I, SABBATH A. OLIVA, a subject of the King of Italy, residing at Danbury, county of Fairfield, State of Connecticut, have invented a new and useful Implement for Applying Rubber Tires, of which the following is a specification.

This invention has for its object to provide a simple and inexpensive implement for applying rubber tires to wheels, more especially to the wheels of baby carriages, go-carts and children's wagons, velocipedes, etc., that can be used with an ordinary vise, will prevent waste of the tire, will enable the user to apply any required amount of tension to the wire and which can be operated by a person not necessarily skilled in the use of tools.

With these and other objects in view I have devised the novel implement for applying or setting rubber tires, of which the following description in connection with the accompanying drawing is a specification, reference characters being used to indicate the several parts.

Figure 2:
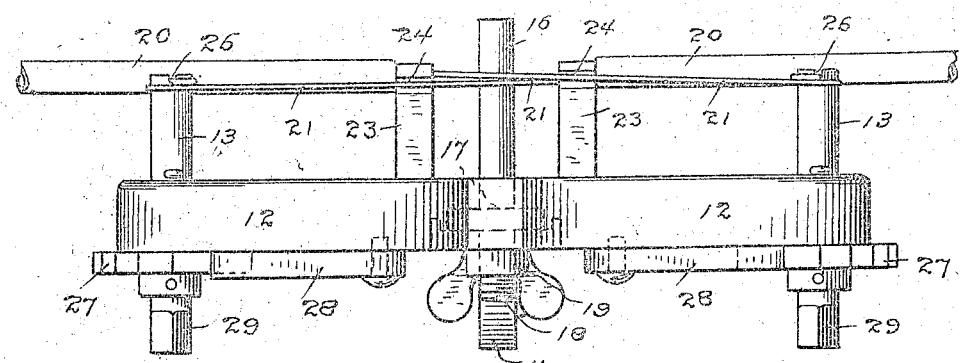
Figure 3:
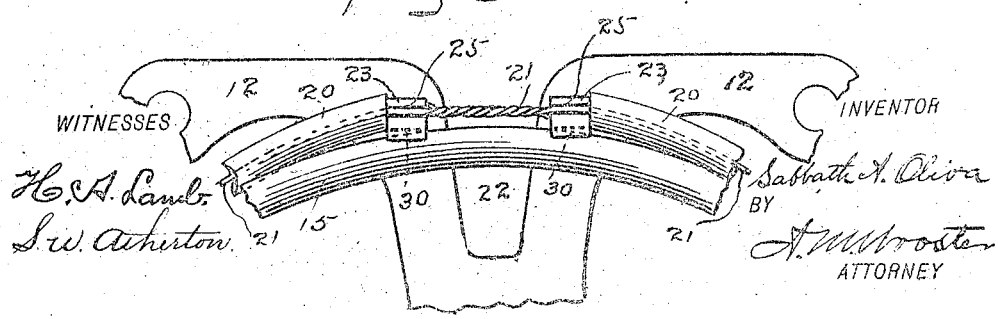

Figure 1 is an elevation illustrating my novel implement as in use in applying a tire; Fig. 2 a plan view of the implement on an enlarged scale; and Fig. 3 is a detail elevation corresponding in scale with Fig. 2, showing the ends of the wire twisted together ready for the releasing of the wheel and the sliding of the ends of the tire over the joint in the wire.

10 denotes the standard which is provided at its lower end with a lug 11 suitably shaped to adapt it to be gripped and held by the jaws of a vise (not shown). The upper end of the standard is bifurcated, thus forming upwardly and outwardly extending arms 12 in each of which a tension shaft 13 is journaled, a space or opening 22 being provided between said arms for a purpose presently described. The standard is provided with a longitudinal slot 14. The wheel to be operated upon, indicated by 15, is mounted upon a stud 16 which passes through the slot. The stud is provided with a fixed collar 17 (see dotted lines Figs. 1 and 2) which is adapted to bear upon the face of the standard on opposite sides of the slot, and is threaded as at 18 to receive a nut 19, preferably a wing nut. The tire is indicated by 20 and the central wire by 21. The tire is usually provided in bulk and is cut to suitable lengths for any sized tires that may be required. The tire is provided with a central hole running through it and the wire is passed through the hole, sufficient length of wire for the requirements of the implement being left extending from each end of the tire. At the upper end of the standard 1 preferably provide an opening 22 and on opposite sides of the opening I provide abutments 23 provided with grooves to receive the ends of the wire. I preferably provide each abutment with a top groove 24 and a front groove 25. Both ends of the wire may be laid in a single groove, but I preferably separate the ends of the wire, as indicated in Fig. 1, and provide the top grooves to carry the ends of the wire away from the ends of the tire and prevent cutting the ends of the tire when tension is applied to the wire. The tension shafts are provided in their front ends with grooves 26 to receive the ends of the wire and on opposite sides of the arms with ratchets 27 which are engaged by pawls 28 pivoted to the arms. These pawls prevent backward movement of the ratchets and tension shafts when tension is applied to the wire. The application of tension may be by means of any convenient tool. I have shown the ends of the tension shafts as made angular, as at 29, to adapt them to receive a suitable wrench or key.

The wheel to be operated upon is mounted upon stud 16, the wing nut loosened and the stud moved upward or downward in slot 14 sufficiently to place the rim of the wheel in engagement with the abutments, as shown in Figs. 1 and 2, grooves 30 being provided in the under sides of the abutments to receive and retain the rim. The tire is then laid in the groove of the rim, as clearly shown, with the ends of the tire resting against abutments 23. The wire from the right end of the tire is then passed through the front groove of the right abutment and the top groove of the left abutment and is then attached to the left tension shaft as by passing it through the groove 26 and winding the end about the shaft. The wire from the left end of the tire is manipulated in the same manner, being passed through the front groove of the left abutment and the top groove of the right abutment and connected to the right tension shaft. Both wires then cross the space 22. The tension shafts are then both rotated forward to place any required degree of tension upon the wire, the tension shafts being held against backward movement by the pawls and ratchets. After the wire has been tightened sufficiently, the ends of wire between the abutments are twisted together by means of a twisting wrench or any suitable tool, the space 22 permitting such tool to be manipulated to twist the wires while they are still held by the tension shafts. After this the ends of wire from the right end of the tire is cut just inside the left abutment, and the wire from the left end of the tire is cut just inside the right abutment, as shown in Fig. 3, which see in connection with Figs. 1 and 2 in which the wires are shown as drawn tight but not twisted. After the twisting operation, the cut ends of the wire are smoothed down, the wheel released from grooves 30 in the abutments, or removed entirely as preferred, by loosening the thumb nut and lowering the stud, after which the ends of the tire are worked over the twisted joint in the wire until the ends of the tire abut against each other. The implement enables the operation of applying or setting a tire to be performed very quickly and effectually, after which the implement may be removed from the vise and laid away on a shelf as it requires but little room.

Having thus described my invention I claim:

1. An implement of the character described, comprising a standard having one end formed to be removably clamped in a vise and having its other end bifurcated and forming upwardly and outwardly extending arms having a space between them, means for securing the wheel to be operated upon, abutments against which the rim of the wheel and the ends of the tire rest and tension shafts for tightening the wire, said abutments and shafts being carried by said arms.

2. An implement of the character described, comprising a standard having one end formed to be removably clamped in a vise and having its other end bifurcated and forming upwardly and outwardly extending arms having a space between them, means for securing the wheel to be operated upon, abutments against which the rim of the wheel and the ends of the tire rest and tension shafts for tightening the wire, said abutments and shafts being carried by said arms, the said abutments being provided with front and top grooves to receive the wire.

3. An implement of the character described, comprising a standard having at its lower end a lug for engagement with a vise and having a longitudinal slot, the upper end of the standard being bifurcated and forming upwardly and outwardly extending arms having a space between them, a wheel supporting stud adjustably mounted in the slot of the standard, and an abutment and a tension shaft carried by each of said arms.

In testimony whereof I affix my signature, in presence of two witnesses.

SABBATH A. OLIVA.

Witnesses:
A. W. WOOSTER,
S. W. ATHERTON.